(12) United States Patent
Jarvis et al.

(10) Patent No.: US 9,090,724 B2
(45) Date of Patent: Jul. 28, 2015

(54) LOW VISCOSITY SUSPENDING VINYL COPOLYMERS

(71) Applicant: Conopco, Inc., Englewood Cliffs, NJ (US)

(72) Inventors: Adam Peter Jarvis, Tarporley (GB); Adam John Limer, Newton-le-Willows (GB); Jean-Philippe Andre Roger Courtois, Northwich (GB); Martin Swanson Vethamuthu, Stewartsville, NJ (US)

(73) Assignee: Conopco, Inc., Englewood Cliffs, NJ (US)

( * ) Notice: Subject to any disclaimer, the term of this patent is extended or adjusted under 35 U.S.C. 154(b) by 0 days.

(21) Appl. No.: 14/347,740

(22) PCT Filed: Sep. 24, 2012

(86) PCT No.: PCT/EP2012/068733
§ 371 (c)(1),
(2) Date: Mar. 27, 2014

(87) PCT Pub. No.: WO2013/045378
PCT Pub. Date: Apr. 4, 2013

(65) Prior Publication Data
US 2014/0256897 A1 Sep. 11, 2014

(30) Foreign Application Priority Data
Sep. 28, 2011 (GB) .................... 1116663.4

(51) Int. Cl.
| | | |
|---|---|---|
| *C08F 222/06* | (2006.01) | |
| *C08F 220/18* | (2006.01) | |
| *C08F 220/06* | (2006.01) | |
| *C09D 7/02* | (2006.01) | |
| *C09D 7/00* | (2006.01) | |

(52) U.S. Cl.
CPC ............. *C08F 222/06* (2013.01); *C08F 220/06* (2013.01); *C08F 220/18* (2013.01); *C09D 7/002* (2013.01); *C09D 7/02* (2013.01); *C08F 2438/00* (2013.01)

(58) Field of Classification Search
CPC .... C08F 222/06; C08F 220/18; C08F 220/06; C09D 7/02

USPC ........................................ 526/271, 318.4, 319
See application file for complete search history.

(56) References Cited

U.S. PATENT DOCUMENTS

| | | | |
|---|---|---|---|
| 4,529,773 A | 7/1985 | Witiak et al. | |
| 4,892,916 A * | 1/1990 | Hawe et al. ................... | 526/304 |
| 5,010,140 A | 4/1991 | Antonelli | |
| 6,656,595 B2 * | 12/2003 | Nakajima et al. ............. | 428/413 |
| 7,288,616 B2 | 10/2007 | Tamareselvy et al. | |
| 7,649,047 B2 | 1/2010 | Tamareselvy et al. | |
| 8,785,536 B2 * | 7/2014 | Mongoin et al. ............... | 524/425 |
| 2003/0202953 A1 | 10/2003 | Tamareselvy | |
| 2009/0163622 A1 | 6/2009 | Albrecht | |
| 2011/0263774 A1 | 10/2011 | Mongoin | |

FOREIGN PATENT DOCUMENTS

| | | |
|---|---|---|
| EP | 0089213 B1 | 2/1986 |
| EP | 0728780 | 8/1996 |
| EP | 1197537 A2 | 4/2002 |
| GB | 1477372 | 6/1977 |
| WO | WO2010026097 A1 | 3/2010 |
| WO | WO2010070407 A1 | 6/2010 |

OTHER PUBLICATIONS

IPRP1 in PCTEP2012068733, Apr. 1, 2014.
IPRP2 in PCTEP2012068731, Dec. 16, 2013.
IPRP2 in PCTEP2012068732, Dec. 17, 2013.
Search Report in PCTEP2012068731, Oct. 23, 2012.
Search Report in PCTEP2012068733, Oct. 23, 2012.
Search Report in PCTEP2012068732.
Written Opinion in PCTEP2012068731, Oct. 23, 2012.
Written Opinion in PCTEP2012068732, Oct. 23, 2012.
Written Opinion in PCTEP2012068733, Oct. 23, 2012.
Copending Application for Jarvis et al., U.S. Appl. No. 14/347,743, filed Mar. 27, 2014 for Thickening Vinyl Copolymers.
Copending Application for Jarvis et al., U.S. Appl. No. 14/347,751, filed Mar. 27, 2014 for Thickening Vinyl Copolymers.

* cited by examiner

*Primary Examiner* — Michael M Bernshteyn
(74) *Attorney, Agent, or Firm* — Ronald A. Koatz

(57) ABSTRACT

A rheology modifier copolymer of formula (I), wherein A is a macromonomer; B is an acrylic or methacrylic acid or salt thereof; C is a polyacidic vinyl monomer selected from maleic, fumaric, itaconic, citraconic and acids combinations thereof and anhydrides and salts thereof; and D optionally when present is a crosslinking monomer.

9 Claims, No Drawings

LOW VISCOSITY SUSPENDING VINYL COPOLYMERS

BACKGROUND OF THE INVENTION

1. Field of the Invention

The invention relates to relatively low viscosity vinyl copolymers, particularly hydrophobically modified alkali-swellable or alkali-soluble emulsion polymers; effective as suspending actives in liquid formulations.

2. The Related Art

Rheology modifiers are used as thickeners and/or structurants in a variety of consumer and industrial products. They affect product performance, aesthetics, application and suspension, and delivery of active chemical agents. Rheology modifiers are generally classed in several categories dependent on the mechanism by which they function.

Hydrodynamic thickeners work by utilizing acid groups in their structure that when neutralized form anionic charges. These repel each other causing the polymer chains to expand and entangle. Thickening and suspending effects of the neutralized polymers are due to increased physical packing of the molecules. These materials are also known as "space filling" or "volume exclusion". Both viscosity and yield point increase with concentration. The alkali swellable emulsions (ASE) and carbomers fall within this category.

Associative thickeners operate by a twin mechanism. They utilize the aforementioned hydrodynamic thickening method. Secondly, they utilize the association of hydrophobic groups on the polymer backbone with other hydrophobic species. The latter can be other hydrophobic polymer groups, oils, particles and the like. Association creates hydrophobic regions distributed throughout the polymer chain network. This also renders the polymers effective as solubilising agents. The hydrophobically modified alkali swellable emulsions (HASE) fall into this category.

HASE/ASE polymers are produced by oil-in-water emulsion polymerization. Most consist of a lightly crosslinked backbone of ethyl acrylate and methacrylic acid.

U.S. Pat. No. 4,529,773 (Witiak et al.) reports alkali-soluble emulsion polymers activated by neutralization to a pH above 6.5, and subsequently acidified in the presence of a surfactant. These are described as useful thickeners in acidified containing compositions. The polymers are best formed from a 3-component monomer system of methacrylic or acrylic acid, methacrylic or acrylic acid ester of a $C_8$-$C_{30}$ alkyl or hydrocarbyl monoether of polyethylene glycol, and a $C_1$-$C_4$ alkyl acrylate or methacrylate.

U.S. Pat. No. 7,649,047 B2 and U.S. Pat. No. 7,288,616, both to Tamareselvy et al., disclose multi-purpose alkali-swellable and alkali-soluble associative polymers. They are formed from polymerizing a monomer mixture of at least one acidic vinyl monomer, at least one nonionic vinyl monomer, a first associative monomer having a first hydrophobic end group, a second associative monomer having a second hydrophobic end group, and a crosslinking or chain transfer agent. These patents describe the HASE type chemistry. A commercial product based on this chemistry is the Lubrizol Corp. supplied Aqua SF-1®.

WO 2010/026097 A1 (Graham et al.) describes rheology modifiers for use in home and personal care compositions. These modifiers are formed from four monomers. They include an amino-substituted vinyl monomer, a hydrophobic nonionic vinyl monomer (such as a $C_1$-$C_{30}$ alkyl ester of acrylic or methacrylic acid), an associative-like monomer (with a polyoxyalkylene unit end-capped with a hydrophobic group), and a further associative-like vinyl monomer.

Most rheology modifiers achieve structuring and suspension effects through thickening of the ligand formula. Very few suspend without significant thickening. Many formulas need to be suspended but also require to retain relatively low viscosity.

SUMMARY OF THE INVENTION

A rheology modifier is provided which is a copolymer of formula (I)

wherein a, b, c and d represent the percentage by weight that each repeating unit monomer is contained within the copolymer;

A is a macromonomer pre-formed by catalytic chain transfer comprising at one end a polymerizable group reactive during polymerization with at least one of B, C and D monomers, the reactive group at the one end of the macromonomer being attached to a chain formed of a homo- or co-polymer of $C_1$-$C_{22}$ alkyl acrylates, $C_1$-$C_{22}$ alkyl methacrylates, methacrylic acid, acrylic acid and combinations thereof, the macromonomer having a number average molecular weight ranging from 500 to about 10,000; and B is acrylic or methacrylic acid or a salt thereof;

C is a polyacidic vinyl monomer selected from the group consisting of maleic, fumaric, itaconic, citraconic and acid combinations thereof and anhydrides and salts thereof; and D is a cross linking monomer for introducing branching and controlling molecular weight, the cross linking monomer comprising polyfunctional units carrying multiple reactive functionalisation groups selected from the group consisting of vinyl, allylic and functional mixtures thereof, the groups A, B, C and D being covalently bonded one to another in a manner selected from a random, a block or a cross-linked copolymer format.

Amounts of "a" may range from about 0.5 to about 25% by weight; amounts of "b" may range from about 70 to about 98% by weight; amounts of "c" may range from about 0.1 to about 15% by weight; and amounts of "d" may range from 0 to about 5% by weight of the total copolymer.

DETAILED DESCRIPTION OF THE INVENTION

Now we have found that copolymers constructed from a pre-formed macromonomer available from catalytic chain transfer polymerization, a polyacidic vinyl monomer, an acrylic or methacrylic acid monomer, and optionally a cross linking monomer provide excellent suspension properties while maintaining a relatively low viscosity.

Macromonomer A

The macromonomers A are polymeric substances pre-formed before reactions with the other B, C and D monomers that form the copolymers of this invention. Macromonomers have at one of the chain ends a polymerizable group capable of reacting with one or more of the monomers of B, C, and D to become incorporated into the copolymer. The reactive end group may be a $C_1$-$C_{22}$ alkyl methacrylate, $C_1$-$C_{22}$ alkyl acrylate, methacrylic acid, acrylic acid and combinations thereof. Illustrative, but not limiting, end groups are methylmethacrylate, ethyl methacrylate, butyl methacrylate, ethyl hexyl methacrylate, stearylmethacrylate and mixtures thereof. These monomers can be transformed into macromonomers, the most preferred of which are poly(methylmethacrylate)/poly(methacrylic acid), poly(methylmethacrylate), poly(butylmethacrylate), poly(ethylhexylmethacrylate) and combinations thereof. In each of these macromonomers, one of the constituent monomers at an end of the chain will remain available for further vinyl reactivity with the other monomer constituents of the copolymers. The Table below reports a series of macromonomers synthesized for the present invention.

| Macromonomer | Structure | Molecular Weight (Mn)/g mol$^{-1}$ |
|---|---|---|
| PMMA:PMAA (59:41) | (structure with $RO_2C$ and $OR$ groups) | 1,100 |
| PMMA | (structure with $MeO_2C$ group) | 1,400 |
| PBMA | (structure with $BuO_2C$ group) | 370<br>700 |
| PEHMA | (structure with $C_8H_{17}O_2C$ group) | 1,000<br>1,500 |

R = H and Me

Macromonomers advantageously may have a number average molecular weight Mn (as determined by liquid permeation chromatography) ranging from 500 to about 10,000, preferably from 700 to about 8,000, and optimally from 1,000 to about 3,000.

Amounts of the macromonomer in the copolymer may range from about 0.5 to about 25%, preferably from about 1 to about 15%, more preferably from about 2 to about 10%, and optimally from about 1 to about 8% by weight relative to total weight of the copolymer.

Macromonomers are prepared by catalytic chain transfer (CCT) procedure utilizing catalysts effective to achieve CCT. Preferred but not limiting catalysts include the cobalt porphyrins and the cobaloximes (especially a tetramethyl-cobaloxime boron fluoride of $C_s=17,900$, and a tetraphenyl-cobaloxime boron fluoride. Molecular weights as low as dimers and trimers can easily be produced with these catalysts unlike with most polymerization techniques.

In copolymers of the present invention, cobalt ions may remain residually present in amounts from 1 to 100 ppm, more likely from 1 to 30 ppm, and even more likely from 3 to 10 ppm by weight. Residual cobalt in the macromonomer units may range for 1 to 100 pph by weight.

Monomer B

B monomers suitable for use herein are acrylic acid, methacrylic acid, and combinations thereof.

In certain embodiments, the acid groups of the monomer may already be neutralized forming salts. Typical salt counterions to the acid groups are sodium, potassium, ammonium and triethanolammonium cations.

Amounts of the B monomer in the copolymers may range from about 70 to about 98%, preferably from about 75 to about 95%, more preferably from about 80 to about 95% by weight of the total copolymer.

Monomer C

The copolymer will include a monomer C which is a polyacid vinyl monomer selected from maleic, fumaric, itaconic, citraconic and acid combinations thereof as well as anhydrides or salts thereof. Most preferred is maleic acid, maleic anhydride or salts of the acid. Salts include the mono- and the di-salt of maleic. In one embodiment maleic acid can be generated from maleic anhydride as starting material and hydrolyzing this to the diacid in the emulsion polymerization.

Monomer C may range from about 0.1 to about 15%, preferably from about 0.8 to about 10%, and more preferably from about 1 to about 8% by weight of the total copolymer.

Cross Linking Monomer

One or more cross linking monomers D optionally may be present in the copolymer for purposes of introducing branching and controlling molecular weight. These monomers will be polyunsaturated. Illustrative but not limiting examples are divinyl benzene, divinyl naphthalene, trivinyl benzene, triallyl pentaerythritol, diallyl pentaerythritol, diallyl sucrose, octaallyl sucrose, trimethylol propane diallyl ether, 1,6-hexanediol di(meth)acrylate, tetramethylene tri(meth)acrylate, trimethylol propane tri(meth)acrylate, polyethoxylated glycol di(meth)acrylate, alkylene bisacrylamides, bisphenol A polyethyoxylated dimethacrylate, trimethylol propane polyethoxylated trimethacrylate and similar materials. Preferred for the present invention is bisphenol A polyethoxylated glycol diacrylate, trimethylol propane triacrylate and diallyl pentaerythritol.

Amounts of the cross linking monomer may range from 0 to about 5%, preferably from about 0.05 to about 3%, more preferably from about 0.1 to about 2%, optimally from about 0.2 to about 1% by weight of the total copolymer.

Formulations with Rheology Modifiers

Rheology modifying copolymers of this invention can be used in a broad range of industrial and consumer products.

These may be found in industries such as adhesives, lubricants (machine and motor vehicle), oil drilling fluids, pharmaceuticals, paints, inks and personal care formulations. Most advantageously, the copolymers are suitable for personal care compositions such as body wash, shampoos, creams and lotions, hair colorants, toothpastes, lipsticks and other color cosmetics.

Common to many of the personal care compositions besides the rheological modifier is one or more surfactants. The surfactants may be anionic, nonionic, cationic, zwitterionic and amphoteric and mixtures thereof. Amounts of the surfactants may range from 0.5 to 30% by weight of the compositions.

Preferred nonionic surfactants are those with a $C_{10}$-$C_{20}$ fatty alcohol or acid hydrophobe condensed with from 2 to 100 moles of ethylene oxide or propylene oxide per mole of hydrophobe; $C_2$-$C_{10}$ alkyl phenols condensed with from 2 to 20 moles of alkylene oxide; mono- and di-fatty acid esters of ethylene glycol; fatty acid monoglyceride; sorbitan, mono- and di-$C_8$-$C_{20}$ fatty acids; and polyoxyethylene sorbitan as well as combinations thereof. Alkyl polyglycosides and saccharide fatty amides (e.g. methyl gluconamides) and trialkylamine oxides are also suitable nonionic surfactants.

Preferred anionic surfactants include soap ($C_8$-$C_{22}$ fatty acid salts); alkyl ether sulfates and sulfonates, alkyl sulfates and sulfonates, alkylbenzene sulfonates, alkyl and dialkyl sulfosuccinates, acyl isethionates, alkyl ether phosphates, sarcosinates, acyl lactylates, sulfoacetates and combinations thereof. The term "alkyl" or "acyl" encompasses from 7 to 24 carbon atoms. Normally the aforementioned anionic surfactants are salts featuring sodium, potassium or ammonium counterions.

Useful amphoteric surfactants include coamidopropyl betaine, $C_{12}$-$C_{20}$ trialkyl betaines, sodium lauroamphoacetate, and sodium laurodiamphoacetate. Cationic surfactants are represented by $C_8$-$C_{22}$ alkyl trimethylammonium salts such as cetyltrimethylammonium chloride.

Formulation compositions containing the copolymers of this invention may also include a carrier. Amounts of the carrier may range from 1 to 95%, preferably from 50 to 90%, optimally from 65 to 85% by eight of the composition. Among the useful carriers are water, esters, hydrocarbons, fatty acids, fatty alcohols, thickeners and combinations thereof. The carrier may be aqueous, anydrous or an emulsion. Preferably the compositions are aqueous, especially water and oil emulsions of the W/O or O/W or triplex W/O/W variety.

All documents referred to herein, including all patents, patent applications, and printed publications, are hereby incorporated by reference in their entirety in this disclosure.

The term "comprising" is meant not to be limiting to any subsequently stated elements but rather to encompass non-specified elements of major or minor functional importance. In other words the listed steps, elements or options need not be exhaustive. Whenever the words "including" or "having" are used, these terms are meant to be equivalent to "comprising" as defined above.

Except in the operating and comparative examples, or where otherwise explicitly indicated, all numbers in this description indicating amounts of material ought to be understood as modified by the word "about".

It should be noted that in specifying any range of concentration or amount, any particular upper concentration can be associated with any particular lower concentration or amount.

EXAMPLE 1

Typical Catalytic Chain Transfer Polymerization

Azo-isobutyronitrile (0.70 g) (AIBN) was dissolved in 2-ethylhexyl methacrylate (150 mL) and butanone (150 mL) in a 2-arm round bottomed flask fitted with a condenser. The solution was sparged with nitrogen for 45 minutes before addition of Cobaloxime Boron Fluoride (COBF) (10.3 mg). The solution was sparged with nitrogen for a further 5 minutes and the reaction mixture heated to 75° C. for 24 hours. Samples were taken periodically for conversion and molecular weight analysis using $^1$H NMR analysis. The resulting macromonomers were purified by removal of solvent and excess monomer in vacuo. Butanone (150 mL) was added to the viscous oil and removed again in vacuo. This cycle was repeated three times to reduce residual monomer content.

Typical Precipitation Polymerization

Stock solutions of acrylic acid (250 mL, 50 w.%), maleic anhydride (250 mL, 15 wt. %), macromonomer (250 mL, 5 wt %), diallyl pentaerythritol (250 mL, 1 wt %), AIBN (250 mL, 0.25 wt %) were made up with ethyl acetate/cyclohexane (54/46 v/v %) in Schott Duran 200 mL flasks. Each flask was sparged with nitrogen for 30 minutes before being added to a Chemspeed Swing Platform. Each reaction flask was manually purged with argon before the Chemspeed Swing Platform was sealed and purged with nitrogen for 30 minutes. The robot was then initialized to add aliquots of each stock solution to the reaction flasks. The reaction flasks were then heated in an H&P heating block at 83° C. for 3 hours. The resulting white precipitates were dried by decanting off the solvent and removing any residual monomer and solvent in vacuo spelling to a fine powder using a food blender.

EXAMPLE 2

A set of copolymers were prepared to evaluate their ability to suspend solids in an aqueous system. The polymerization was conducted in a solvent of ethyl acetate/cyclohexane (54/46 v/v percent). Table I below lists the polymer components; solvent and free radical (AIBN) initiator were kept constant and are not tabulated for reasons of simplicity. Since potassium carbonate is a solid material, this substance has been tabulated and the weight percent of material in the Table is recorded as weight percent outside of solvent/AIBN.

Copolymers (3.5 g) prepared as noted above were added and dispersed in water (696.5 g) while mixing with an overhead stirrer. The pH was then adjusted to pH 7.0 using a 0.1M sodium hydroxide solution. Sodium Chloride (0.15 g, 0.1 wt. %) was then added to an aliquot (150 mL) of copolymer solution. Viscosities and suspension properties were evaluated and are recorded below the copolymer formulas in Table I.

TABLE I

| | Sample (Weight %) | | | | | | | | | |
|---|---|---|---|---|---|---|---|---|---|---|
| | A | B | C | D | E | F | G | H | I | J |
| Copolymer Component | | | | | | | | | | |
| Acrylic Acid | 83.89 | 85.39 | 83.89 | 83.89 | 85.39 | 86.4 | 83.9 | 73.13 | 71.30 | 69.30 |
| Maleic Anhydride | 2.50 | 1.00 | 2.50 | 2.50 | 1.00 | — | 2.50 | 1.88 | 3.75 | 5.62 |
| PMMA 1400[1] | 10.00 | 10.00 | — | — | — | — | — | — | — | — |
| PBMA 360[2] | — | — | 10.00 | — | — | — | — | — | — | — |
| PEHMA1000[3] | — | — | — | 10.00 | 10.00 | — | — | — | — | — |
| PBMA 700[4] | — | — | — | — | — | 10 | 10 | — | — | — |
| Diallyl Pentaerythritol | 0.86 | 0.86 | 0.86 | 0.86 | 0.86 | 0.86 | 0.86 | 0.66 | 0.66 | 0.66 |
| Potassium Carbonate | 2.75 | 2.75 | 2.75 | 2.75 | 2.75 | 2.75 | 2.75 | 2.10 | 2.10 | 2.10 |
| Viscosity (Pa · s) | | | | | | | | | | |
| NaCl (0%) | 14000* | 31000* | ** | 24500* | 52600* | 78600 | 19500 | ** | ** | ** |
| NaCl (0.1%) | ** | ** | ** | ** | ** | 9100 | ** | ** | ** | ** |
| Suspension | VG | VG | NG | VG | VG | NG† | VG | NG | NG | NG |

\* Brookfield Viscometer Spindle No. 6, speed 10, at 23° C.
\*\* Viscosities below 10,000 Pa · s could not be measured accurately with spindle 6 (the copolymer fluids were too thin (i.e. too thin to measure)).
[1]Polymethylmethacrylate 1400 mw
[2]Polybutylmethacrylate 360 mw
[3]Polyethylhexylmethacrylate 1000 mw
[4]Polybutylmethacrylate 700 mw
VG means very good suspension at 0 and 0.1 wt. % NaCl
NG means poor suspension at 0 and 0.1 wt. % NaCl
NG† means good suspension at 0 but poor at 0.1 wt. % NaCl Inventive Samples A, B, D, E and G were very good (VG) at achieving suspension. Sample C proved ineffective (NG) in providing the required suspension properties. Sample F did not incorporate maleic anhydride (acid or salt thereof) which evidently resulted in poor suspension in the presence of 0.1% sodium chloride. Failure of copolymer Sample C is attributed to the low molecular weight (360 mw) of the macromonomer component polybutylmethacrylate (PBMA 360). Apparently, higher molecular weight macromonomer components such as the PMMA 1400, PBMA (700) and PEHMA 1000 were necessary to achieve adequate suspension properties. Samples H, I and J did not incorporate any macromonomer. All three of these copolymers exhibited poor suspension.

In summary, the present invention is described above in terms of a preferred and other embodiments. The invention is not limited, however, to the described and depicted embodiments. Rather, the invention is only limited by the claims appended hereto.

The invention claimed is:

1. A rheology modifier copolymer of formula (I)

(I)

wherein a, b, c, and d represent the percentage by weight that each repeating unit or derived monomer is contained within the copolymer, these percentages being:
a ranges from about 0.5 to about 25% by weight of the copolymer;
b ranges from about 70 to about 98% by weight of the copolymer;
c ranges from about 0.1 to about 15% by weight of the copolymer; and
d ranges from 0 to about 5% by weight of the copolymer;
A is a macromonomer pre-formed by catalytic chain transfer comprising at one end a polymerizable group reactive during polymerization with at least one of B, C, and D monomers, the reactive group at the one end of the macromonomer being attached to a chain formed of a homo- or co-polymer of $C_1$-$C_{22}$ alkyl acrylates, $C_1$-$C_{22}$ alkyl methacrylates, methacrylic acid, acrylic acid and combinations thereof, the macromonomer having a number average molecular weight ranging from 500 to about 10,000; and
B is acrylic or methacrylic acid or a salt thereof;
C is a polyacidic vinyl monomer selected from the group consisting of maleic, fumaric, itaconic, citraconic acid and combinations thereof and anhydrides and salts thereof; and
D is a cross linking monomer for introducing branching and controlling molecular weight, the cross linking monomer comprising polyfunctional units carrying multiple reactive functionalization groups selected from the group consisting of vinyl, allylic and functional mixtures thereof, the groups A, B, C and D being covalently bonded one to another in a random, a block, or a cross-linked copolymer format.

2. The copolymer according to claim 1 wherein the macromonomer A has a number average molecular weight ranging from about 700 to about 8,000.

3. The copolymer according to claim 1 wherein the macromonomer A is selected from the group consisting of polymethylmethacrylate/polymethacrylic acid, polymethylmethacrylate, polymethylacrylate, polybutylmethacrylate, polyethylhexylmethacrylate and combinations thereof.

4. The copolymer according to claim 1 wherein the macromonomer A is pre-formed by polymerization through incorporation of a catalytic chain transfer agent which is a cobalt catalyst.

5. The copolymer according to claim 1 wherein monomer B is acrylic acid or salts thereof.

6. The copolymer according to claim 1 wherein monomer C is selected from the group consisting of maleic anhydride, maleic acid, maleic salt or combination thereof.

7. The copolymer according to claim 1 wherein all acid units are in salt form.

8. The copolymer according to claim 1 wherein
a ranges from about 1 to about 15% by weight of the copolymer;
b ranges from about 75 to about 95% by weight of the copolymer;
c ranges from about 0.8 to about 10% by weight of the copolymer; and
d ranges from 0.01 to about 3% by weight of the copolymer.

9. The copolymer according to claim 1 further comprising cobalt in an amount from about 1 to about 100 ppm by weight of the copolymer.

* * * * *